(12) United States Patent
Chiang et al.

(10) Patent No.: US 8,576,198 B2
(45) Date of Patent: Nov. 5, 2013

(54) DIGITAL CAPACITIVE TOUCH PANEL STRUCTURE

(75) Inventors: Hsueh-Chih Chiang, Tao-Yuan (TW);
Shih-Liang Chou, Tao-Yuan (TW);
Jyh-An Chen, Tao-Yuan (TW);
Ming-Hung Hsieh, Tao-Yuan (TW)

(73) Assignee: Applied Vacuum Coating Technologies Co., Ltd., Tao-Yuan (TW)

( * ) Notice: Subject to any disclaimer, the term of this patent is extended or adjusted under 35 U.S.C. 154(b) by 0 days.

(21) Appl. No.: 13/584,674

(22) Filed: Aug. 13, 2012

(65) Prior Publication Data

US 2012/0306814 A1    Dec. 6, 2012

Related U.S. Application Data

(63) Continuation of application No. 12/496,703, filed on Jul. 2, 2009.

(51) Int. Cl.
*G06F 3/045* (2006.01)

(52) U.S. Cl.
USPC .................. 345/174; 345/173; 178/18.01

(58) Field of Classification Search
USPC ............ 345/173–178; 178/18.06, 19.03
See application file for complete search history.

(56) References Cited

U.S. PATENT DOCUMENTS

| | | | | |
|---|---|---|---|---|
| 4,550,221 A | * | 10/1985 | Mabusth | 178/18.06 |
| 4,686,332 A | * | 8/1987 | Greanias et al. | 345/173 |
| 8,209,861 B2 | * | 7/2012 | Long et al. | 29/847 |
| 8,228,306 B2 | * | 7/2012 | Long et al. | 345/173 |
| 8,279,361 B2 | * | 10/2012 | Chen et al. | 349/12 |
| 2004/0017362 A1 | * | 1/2004 | Mulligan et al. | 345/173 |
| 2004/0223089 A1 | * | 11/2004 | Hong et al. | 349/12 |
| 2005/0208864 A1 | * | 9/2005 | Wei et al. | 445/24 |
| 2006/0050063 A1 | * | 3/2006 | Tanabe et al. | 345/173 |
| 2007/0240914 A1 | * | 10/2007 | Lai et al. | 178/18.06 |
| 2008/0238881 A1 | * | 10/2008 | Perski et al. | 345/173 |
| 2008/0266272 A1 | * | 10/2008 | Narayan et al. | 345/174 |
| 2009/0091549 A1 | * | 4/2009 | Matsumoto et al. | 345/173 |
| 2009/0101489 A1 | * | 4/2009 | Lee | 200/600 |
| 2009/0223723 A1 | * | 9/2009 | Yang | 178/18.06 |
| 2009/0255737 A1 | * | 10/2009 | Chang et al. | 178/18.06 |
| 2010/0214230 A1 | * | 8/2010 | Chu et al. | 345/173 |

* cited by examiner

*Primary Examiner* — Amare Mengistu
*Assistant Examiner* — Premal Patel
(74) *Attorney, Agent, or Firm* — Jackson IPG PLLC

(57) ABSTRACT

The present invention discloses a touch panel structure formed by an anti-scratch surface layer and a capacitive sensor layer, and a transparent lamination layer is used for pasting the two into a panel. The capacitive sensor layer includes an X-axis first transparent conductive layer and a Y-axis second transparent conductive layer formed on both sides of a transparent plastic carrier to provide a touch panel structure having the advantages of a relatively low material cost, a light weight, an easy manufacturing and molding, a better lamination yield and a flexible and break-free feature.

8 Claims, 6 Drawing Sheets

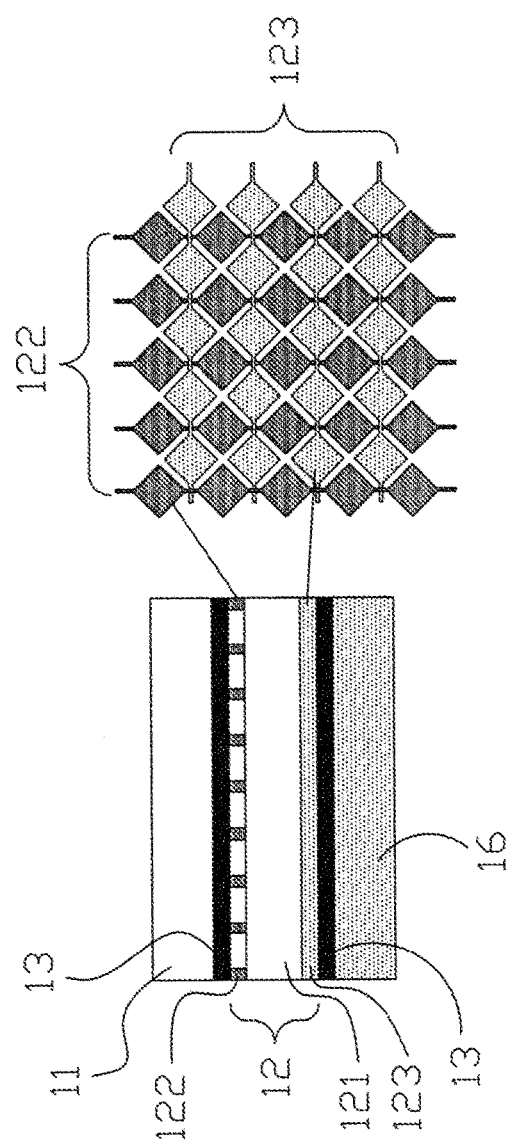

DIGITAL CAPACITIVE TOUCH PANEL STRUCTURE

CROSS-REFERENCE TO RELATED APPLICATION

This application is a continuation application of U.S. Ser. No. 12/496,703, filed Jul. 2, 2009, the disclosure of which is incorporated herein by reference in its entirety.

BACKGROUND OF THE INVENTION (a) Field of the Invention

The present invention relates to a novel structure of a touch panel, in particular to a touch panel structure having the advantages of a relatively low material cost, a light weight, an easy manufacturing and molding process, a better lamination yield and a flexible and break-free feature.

(b) Description of the Related Art

Touch panel is mainly divided into resistive, capacitive, surface acoustic wave, or optical IR touch panel according to its different sense method. Among them, resistive and capacitive touch panels are used widely, wherein the structure of the resistive touch panel seems a sandwich, the top layer is an transparent conductive plastic film and the down layer is a conductive carrier, dot spacers are filled with between them and a voltage of 5V is introduced. The top layer will touch the down layer when it is touched (or knock little) by a finger or a pen, and a delta voltage (ΔV) will be produced. An A/D controller will converts the delta voltage into a digital signal provided for a computer to compute (X,Y)-axes positions to achieve a excellent position accuracy.

Basically, the capacitive touch panel improves the scratch resistance of the resistive touch panel and solves the circuit break issue that will cause a failure of the touch panel if the top layer (the transparent conductive film) is scratched seriously. With reference to FIG. 1 for a basic structure of a conventional capacitive touch panel, the outermost layer is an anti-scratch layer 11 made of glass, and the second layer is a capacitive sensor structure 12 covered by the anti-scratch layer 11, and the capacitive sensor structure 12 adopts both sides of a single sheet glass 121 to form an X-axis-wise capacitive sensor layer 122 and a Y-axis-wise capacitive sensor layer 123 (or adopts two glass pieces to form the X-axis-wise and Y-axis-wise capacitive sensor layers on a single side of each glass piece, such that a uniform electric field is produced between the X-axis-wise capacitive sensor layer 122 and the Y-axis-wise capacitive sensor layer 123 as shown in FIG. 2 and provided for sensing a weak current of a human body to achieve a touch control effect.

In the conventional touch panel as shown in FIG. 1, the anti-scratch layer 11 and capacitive sensor structure 12 are glass substrates. Although the capacitive sensor structure 12 can be manufactured by etching (a photolithography process included in color filtered) and the pattern by this way is not visible, the cost of the required equipments and manufacturing processes are too high and not cost-effective. Furthermore, a transparent lamination layer 13 is used as a linking bridge or is pasted to a surface of an LCD panel 16. The glass-to-glass lamination method, which the both layer are so hard, not only results in a poor lamination yield, but also has difficulties to get a good accuracy and arises into a risk of breaking the panel easily.

There is another type of touch panel structures as shown in FIG. 3 available in the market, and a capacitive sensor structure 14 of this conventional touch panel includes two transparent conductive plastic films 141, 142 formed on an X-axis-wise capacitive sensor layer and a Y-axis-wise capacitive sensor layer respectively, and a transparent lamination layer 13 is used to paste the two transparent conductive plastic films 141, 142. Similarly, an anti-scratch layer 11 made of glass is pasted to the top of the capacitive sensor structure 14 by the transparent lamination layer 13, and another transparent conductive plastic film 15 as an EMI shielding function is pasted to the bottom of the capacitive sensor structure 14.

However, the conventional touch panel as shown in FIG. 3 has a relatively complicated structure and high material and manufacturing costs, and the capacitive sensor layers of the transparent conductive plastic films 141, 142 are produced by a traditional screen printing etching method, and whose capacitive sensor pattern has a relatively low precision. In addition, the anti-scratch layer 11 is also made of glass, and has the same issues of a low lamination yield r, a high cost and a risk of breaking the panel easily. The touch panel is formed by stacking and combining a plurality of sensor layers and insulat layers, not only resulting in a thicker panel, but also decreasing the light transmission of the touch panel substantially.

SUMMARY OF THE INVENTION

Therefore, it is a primary objective of the present invention to provide a touch panel structure with the advantages of a relatively low material cost, a light weight, an easy manufacturing and molding process, a better lamination yield and a flexible and break-free feature.

To achieve the foregoing objectives, the present invention provides a touch panel structure comprising an anti-scratch surface layer and a capacitive sensor layer, wherein a transparent laminated layer is used as a linking bridge laminated between the top and down layers, and the anti-scratch surface layer can be a transparent plastic film that has been treatmented by hard coating process, and the capacitive sensor layer includes an X-axis first transparent conductive layer and a Y-axis second transparent conductive layer formed on both sides of a transparent plastic carrier respectively, and first and second transparent conductive layers include a plurality of X-axis first sense elements and Y-axis second sense elements alternately arranged with one another, such that each sensor element in the same axis is electrically connected, and insulated from each sensor element in another axis, and a uniform electric field is produced between the X-axis first transparent conductive layer and the Y-axis second transparent conductive layer. In addition, the whole touch panel structure includes a transparent conductive plastic film as an EMI shielding function which is pasted to the bottom of the capacitive sensor layer and allows the whole touch panel structure to be operated at an noise-free environment.

BRIEF DESCRIPTION OF THE DRAWINGS

FIG. 1 is a cross-sectional view of a conventional touch panel structure;

FIG. 2 is a schematic view of an electric field produced by an X-axis capacitive sensor layer and a Y-axis capacitive sensor layer;

DETAILED DESCRIPTION OF THE PREFERRED EMBODIMENTS

Figure 4A:
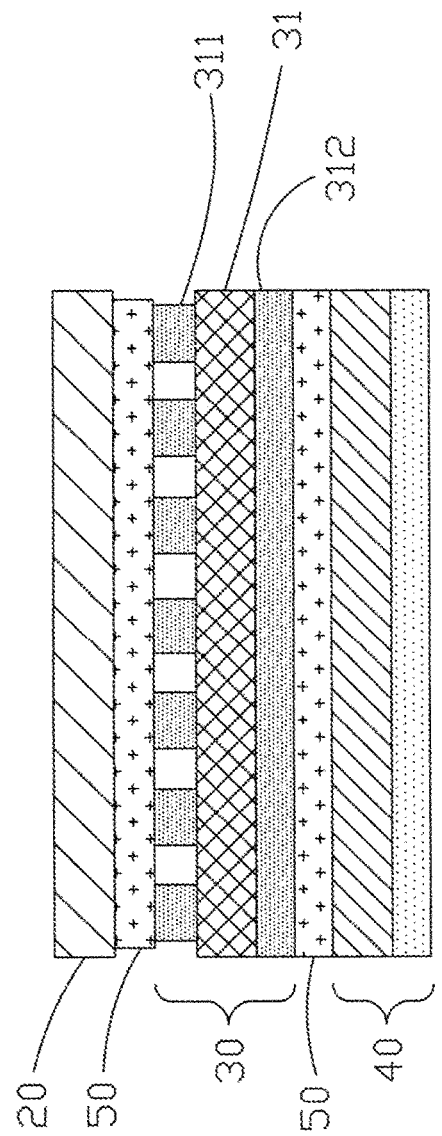
FIG. 4A is a cross-sectional view of a touch panel structure in accordance with a first preferred embodiment of the present invention.
Figure 4B:
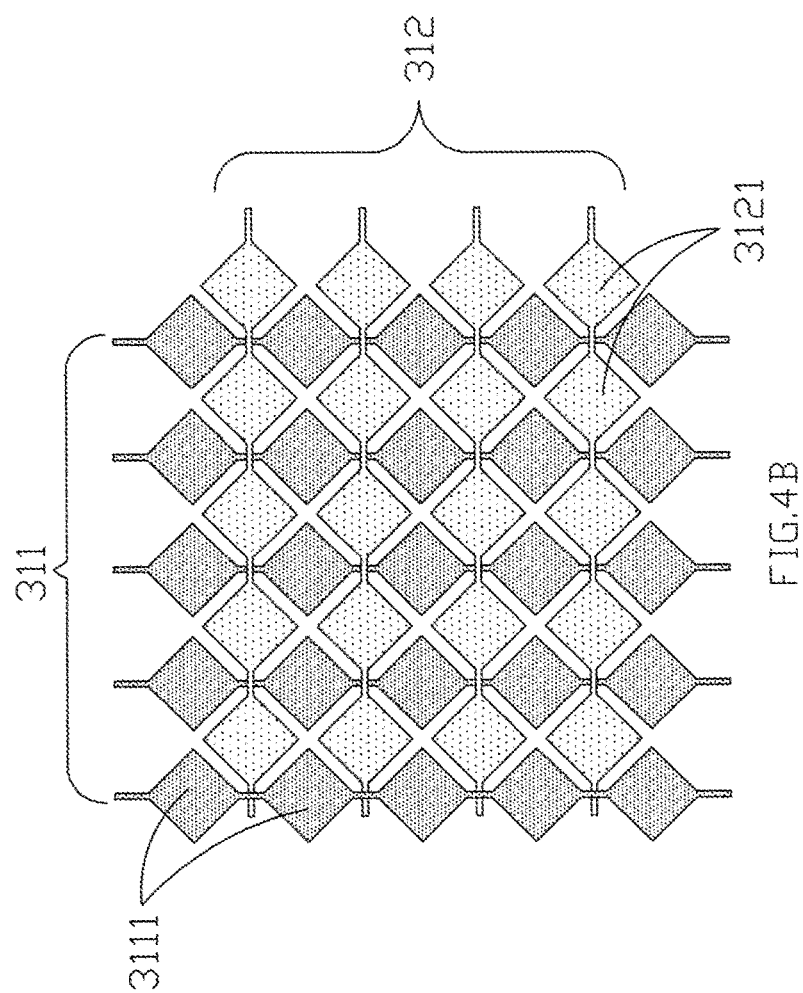
FIG. 4B is a schematic view of first and second transparent conductive layers of the present invention.

With reference to FIGS. 4A and 4B for a touch panel structure in accordance with a first preferred embodiment of the present invention, the touch panel structure comprises an anti-scratch surface layer 20 and a capacitive sensor layer 30.

The anti-scratch surface layer 20 is made of a transparent plastic film which has been treatment by the hard coating. In general, a thin polyethylene terephthalate (PET) panel is used as a substrate. The capacitive sensor layer 30 includes an X-axis first transparent conductive layer 311 and a Y-axis second transparent conductive layer 312 formed on both sides of a transparent plastic carrier 31 respectively, wherein the first and second transparent conductive layers 311, 312 include a plurality of X-axis first sense element 3111 and Y-axis second sense elements 3121 alternately arranged in an array form, such that each sense element in the same axis is electrically connected and insulated from each sense element in another axis. In other words, the first sense elements 3111 in the X-axis are electrically connected with one another, and the second sense elements in the Y-axis are electrically connected with one another, and each first sense element 3111 is insulated from each second sense element 3121, so as to produce an uniform electric field between the separated X-axis first transparent conductive layer 311 and Y-axis second transparent conductive layer 312.

In an embodiment, the capacitive sensor layer 30 is pasted to the bottom of the anti-scratch surface layer 20 by a transparent lamination layer 50 and protected by a shielding effect of the anti-scratch surface layer 20. The capacitive sensor layer 30 further includes a conductive layer 40 pasted to the bottom of the capacitive sensor layer 30 reaching an EMI shielding function to maintain the whole touch panel structure to be operated at an EMI free environment. The conductive layer 40 is made of an indium tin oxide (ITO) conductive film and pasted to the bottom of the capacitive sensor layer 30 by the transparent laminated layer 50.

Figure 5:
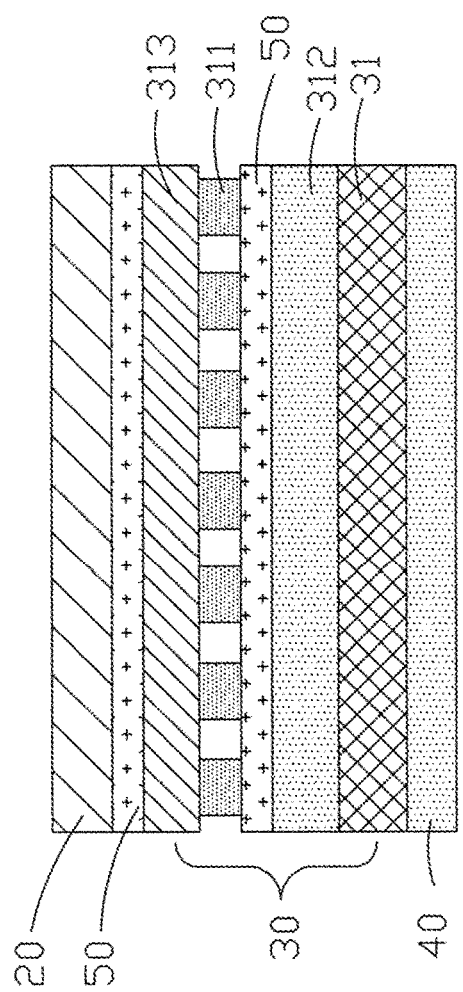
FIG. 5 is a cross-sectional view of a touch panel structure in accordance with a second preferred embodiment of the present invention.

With reference to FIG. 5 for a second preferred embodiment of the present invention, the touch panel structure comprises an anti-scratch surface layer 20 and a capacitive sensor layer 30.

Figure 3:
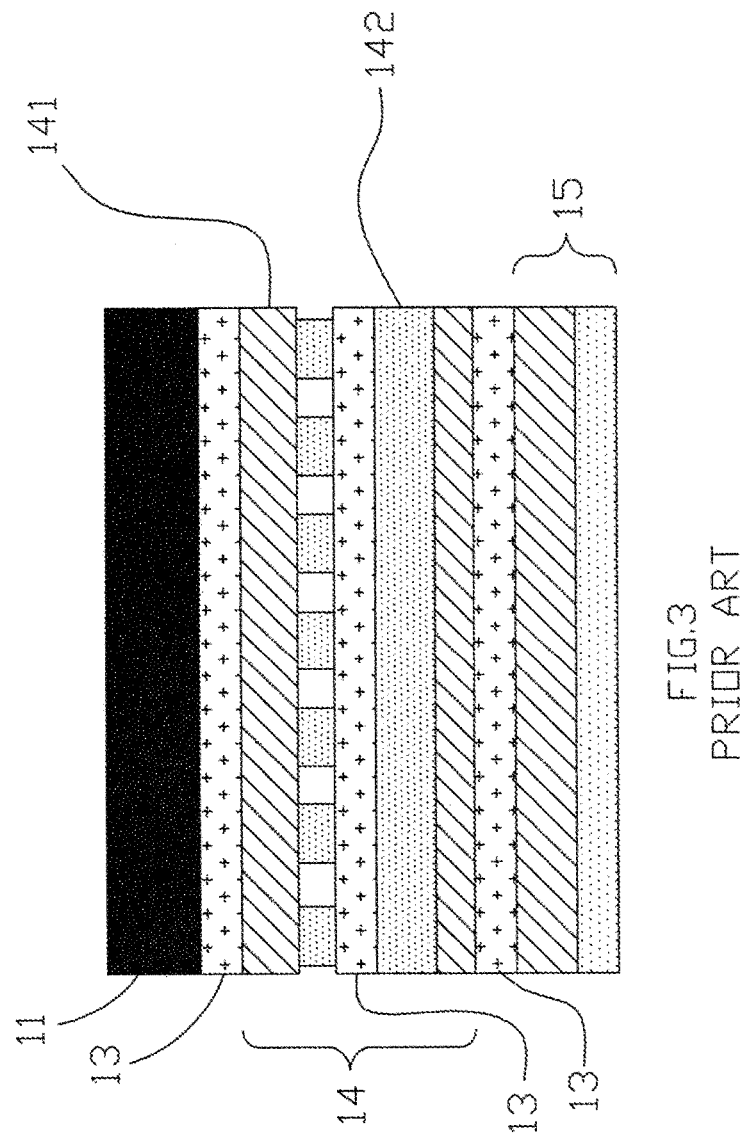
FIG. 3 is a cross-sectional view of another conventional touch panel structure.

The capacitive sensor layer 30 includes a Y-axis second transparent conductive layer 312 formed on a side of a transparent plastic carrier 31 as shown in the figure, and the Y-axis second transparent conductive layer 312 is disposed on the top of the transparent plastic carrier 31, and an X-axis first transparent conductive layer 311 is pasted to the top of the Y-axis second transparent conductive layer 312 by a transparent lamination layer 50 to produce a uniform electric field between the X-axis first transparent conductive layer 311 and the Y-axis second transparent conductive layer 312. Of course, the X-axis first transparent conductive layer 311 can be disposed on a substrate 313 (which can be a polyethylene terephthalate (PET) film) and pasted directly onto the top of the Y-axis second transparent conductive layer 312. In other words, the X-axis first transparent conductive layer 311 is positioned at the bottom of the substrate 313. Alternatively, the substrate 313 can be pasted directly onto the top of the Y-axis second transparent conductive layer 312 according to a third preferred embodiment of the present invention as shown in FIG. 3. In other words, the X-axis first transparent conductive layer 311 is positioned on the top of the substrate 313.

Figure 6:
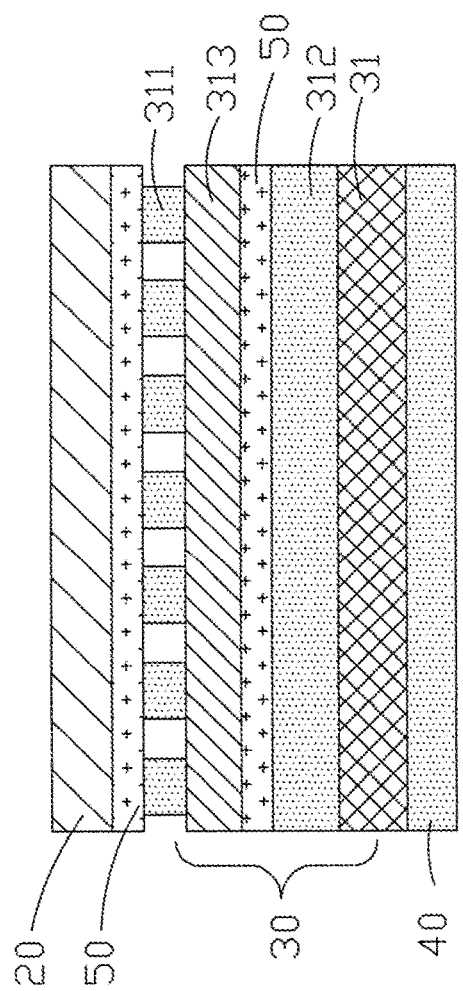
FIG. 6 is a cross-sectional view of a touch panel structure in accordance with a third preferred embodiment of the present invention.

In an embodiment, the capacitive sensor layer 30 is pasted to the bottom of the anti-scratch surface layer 20 by a transparent lamination layer 50 and protected by a shielding effect of the anti-scratch surface layer 20. In addition, the capacitive sensor layer 30 further includes a conductive layer 40 pasted on the bottom of the capacitive sensor layer 30 as shown in FIGS. 5 and 6, and the conductive layer 40 is coated at the bottom of the transparent plastic carrier 31 directly by a method such as a low temperature sputtering method.

Compared with the conventional touch panel structure, the touch panel structure in accordance with present invention comes with a relatively simpler structure to reduce the material cost and the weight of the whole touch panel structure substantially, and thus the present invention is suitable for the development of a thin and lightweight design.

In this preferred embodiment, the transparent plastic carrier 31 can be from different plastic material such as polycarbonate (PC), polymethylmethacrylate (PMMA), polyethylene terephthalate (PET) or any other cyclic olefin copolymer, and preferably a polycarbonate resin which is polycarbonate (PC) in this embodiment, and the transparent plastic carrier preferably must has a thickness greater than 0.5 mm, so that there will be have a good impact-resistance, high thermal stability, high gloss, effective bacteria suppression effect, and excellent flame-resistance and anti-smudge.

Therefore, a polycarbonate (PC) sheet used as a substrate of the capacitive sensor layer 30 in the present invention not only facilitates the optical lamination, but also provides a better lamination yield and an easy maintenance.

Since the polycarbonate (PC) sheet has an excellent mechanical property for supporting the whole touch panel, such that the whole touch panel structure can be flexible without the risk of being broken easily.

The X-axis first transparent conductive layer 311 and the Y-axis second transparent conductive layer 312 are indium tin oxide (ITO) transparent conductive films formed on both sides of the transparent plastic carrier 31 respectively by a low temperature sputtering method.

Compared with the conventional touch panel structure, the touch panel structure of the present invention comes with a relatively simpler structure to reduce the material cost and the weight of the whole touch panel structure substantially, and thus the present invention is suitable for the development of a thin and lightweight design.

Compared with the conventional touch panel structure, the touch panel structure of the present invention has the following advantages:

1. The whole touch panel structure is relatively simpler to reduce the material cost and the weight of the whole touch panel structure substantially.

2. The transparent plastic carrier 31 of the capacitive sensor layer is made of an industrial plastic material which is a polycarbonate (PC) substrate for facilitating an optical lamination with a polycarbonate (PC) sheet, and thus resulting in a better lamination yield and an easier maintenance.

3. The transparent plastic carrier 31 of the capacitive sensor layer 30 is a polycarbonate (PC) sheet, not only having a good mechanical property for supporting the whole touch panel, but also providing a better flexibility of the whole touch panel structure to prevent it from being broken easily.

4. The capacitive sensor layer 30 having the X-axis first transparent conductive layer 311 and the Y-axis second transparent conductive layer 312 formed on both sides of the transparent plastic carrier 31 respectively can overcome inaccurate alignments of the X-axis and Y-axis.

5. Unlike the conventional touch panel structure having at least one glass substrate, the whole touch panel structure is made of a plastic substrate, and thus the invention has the advantages of providing an easy molding process and reducing the risk of breaking the panel.

While the invention has been described by means of specific embodiments, numerous modifications and variations could be made thereto by those skilled in the art without departing from the scope and spirit of the invention set forth in the claims.

We claim:

1. A touch panel structure, comprising:
   an anti-scratch surface layer made of a tempered transparent plastic film; and
   a capacitive sensor layer, adhered to the bottom of the anti-scratch surface layer, and having
   an X-axis first transparent conductive layer adhered to the anti-scratch surface layer via a first transparent lamination layer and
   a Y-axis second transparent conductive layer formed on both sides of
   a transparent plastic carrier respectively, and the first and second transparent conductive layers including a plurality of X-axis first sense elements and Y-axis sense elements respectively and alternately arranged in an array form, such that each sense element in the same axis is connected electrically and insulated from each sense element in another axis and wherein the transparent plastic carrier is made of a polycarbonate resin and also provides structural support as a substrate; and
   a conductive layer adhered to the Y-axis second transparent conductive layer via a second transparent lamination layer and providing an EMI shielding function.

2. The touch panel structure of claim 1,
   wherein the transparent plastic carrier is made of an industrial plastic material selected from the collection of polycarbonate (PC), polymethylmethacrylate (PMMA), polyethylene terephthalate (PET) and any other cyclic olefin copolymer.

3. The touch panel structure of claim 1,
   wherein the transparent plastic carrier has a thickness greater than 0.5 mm.

4. The touch panel structure of claim 1, wherein the X-axis first transparent conductive layer is an indium tin oxide (ITO) transparent conductive film, and the Y-axis second transparent conductive layer is an indium tin oxide (ITO) transparent conductive film.

5. The touch panel structure of claim 1, wherein the X-axis first transparent conductive layer is formed on a side of the transparent plastic carrier by a low temperature sputtering method.

6. The touch panel structure of claim 1, wherein the Y-axis second transparent conductive layer is formed on another side of the transparent plastic carrier by a low temperature sputtering method.

7. The touch panel structure of claim 1, wherein the anti-scratch surface layer is made of a polyethylene terephthalate (PET) film that has been treatmented by hard coating.

8. The touch panel structure of claim 1, wherein the conductive layer is made of an indium tin oxide (ITO) conductive film, and pasted to the bottom of the capacitive sensor layer by the second transparent lamination layer.

* * * * *